(12) United States Patent
Haro et al.

(10) Patent No.: US 11,823,239 B2
(45) Date of Patent: Nov. 21, 2023

(54) SYSTEMS AND METHODS FOR CUSTOMIZING ELECTRONIC

(71) Applicant: eBay Inc., San Jose, CA (US)

(72) Inventors: Antonio Haro, San Jose, CA (US); Vikas Singh, San Jose, CA (US)

(73) Assignee: eBay Inc., San Jose, CA (US)

( * ) Notice: Subject to any disclaimer, the term of this patent is extended or adjusted under 35 U.S.C. 154(b) by 352 days.

(21) Appl. No.: 17/357,766

(22) Filed: Jun. 24, 2021

(65) Prior Publication Data
US 2022/0414724 A1   Dec. 29, 2022

(51) Int. Cl.
*G06Q 30/00*    (2023.01)
*G06Q 30/0601*  (2023.01)
*G06N 20/00*    (2019.01)
*G06F 8/65*     (2018.01)

(52) U.S. Cl.
CPC .......... *G06Q 30/0601* (2013.01); *G06F 8/65* (2013.01); *G06N 20/00* (2019.01)

(58) Field of Classification Search
CPC ................................................ G06Q 30/06–08
See application file for complete search history.

(56) References Cited

U.S. PATENT DOCUMENTS

| | | | |
|---|---|---|---|
| 2007/0050750 A1* | 3/2007 | Bykov | G06F 8/61 717/174 |
| 2016/0225053 A1 | 8/2016 | Romley et al. | |
| 2019/0325498 A1* | 10/2019 | Clark | G06Q 30/0625 |

* cited by examiner

*Primary Examiner* — Ethan D Civan
(74) *Attorney, Agent, or Firm* — FIG. 1 Patents

(57) ABSTRACT

An application configured to be dynamically and/or incrementally updated to tailor capabilities of the application to areas of interest of a user is disclosed. The application receives one or more task-specific modules for enhancing a task-specific capability of the application. The one or more task-specific modules are identified from among a plurality of task-specific modules, based on user data indicative of interaction of the user with an electronic marketplace. The one or more task-specific modules are used to update a general module configured to implement the task-specific capability of the application to create a customized application. The customized application is used to perform a task-specific operation based on an input provided by the user, and a result of the task-specific operation to be presented to the user.

20 Claims, 5 Drawing Sheets

SYSTEMS AND METHODS FOR CUSTOMIZING ELECTRONIC

BACKGROUND

Various applications, such as electronic marketplace applications, are commonly utilized by users to perform various on-line tasks, such as selling and/or buying items in an electronic marketplace. Such applications often include various capabilities that allow the users to more quickly and efficiently perform the various tasks. For example, an electronic marketplace application may include capability to allow a user to provide an image or a video stream that includes an item that the user wishes to sell, to provide the user with a one-click option to list the item in the electronic marketplace based on a catalogue entry that may be identified using identification or recognition of the item in the image or the video stream. As another example, the electronic marketplace application may include a module that may assist users in completing forms for listing items in the electronic marketplace or for identifying items that the user may buy in the electronic marketplace. Such capabilities included in typical marketplace applications, however, are generally standard and not tailored or customized for particular users of the marketplace applications. Moreover, updates of such marketplace applications typically provide same updated capabilities to different users' applications, which sometimes results in significant unnecessary increases of size, memory storage requirements, web browser space requirements, etc., of the users' applications.

It is with respect to these and other general considerations that the aspects disclosed herein have been made. Although relatively specific problems may be discussed, it should be understood that the examples should not be limited to solving the specific problems identified in the background or elsewhere in this disclosure.

SUMMARY

Aspects of the present disclosure relate to systems and methods for customizing electronic marketplace applications to tailor capabilities of the electronic marketplace applications to areas of interest of users that interact with an electronic marketplace via the electronic marketplace applications. In doing so, electronic marketplace applications associated with different users may be dynamically and incrementally enhanced based on user interests or needs without performing overall updates of the users' electronic marketplace applications and without causing unnecessary increases in size, memory storage requirements, web browser space requirements, etc. of the users' electronic marketplace applications.

In aspects, a system for customizing an application is provided. The system comprises a processor and memory including instructions which, when executed by the processor, causes the processor to perform operations. The operations include receiving one or more task-specific modules configured to enhance a task-specific capability of the application, wherein the one or more task-specific modules are identified, from among a plurality of task-specific modules, based at least on user data indicative of interaction of the user with an electronic marketplace. The operations also include updating, with the one or more task-specific modules, a general module configured to implement the task-specific capability of the application, to create a customized application. The operations additionally include performing, using the customized application, a task-specific operation based on an input provided by the user, and causing a result of the task-specific operation to be presented to the user.

In further aspects, a method for customizing experience of a user of an electronic marketplace application is provided. The method includes obtaining user data indicative of interaction of the user with an electronic marketplace. The method also includes determining, based on the user data, one or more task-specific modules of interest to the user, the one or more task-specific modules for enhancing a task-specific capability of the application. The method additionally includes performing, using a particular task-specific module among the one or more task-specific modules, an operation based on input provided by the user; and causing a result of the operation to be presented to the user.

In still further aspects, computer storage medium is provided. The computer storage media encodes computer executable instructions that, when executed by at least one processor, perform a method. The method includes receiving one or more task-specific modules configured to enhance a task-specific capability of an application, wherein the one or more task-specific modules are identified from among a plurality of task-specific modules, based on user data indicative of interaction of the user with an electronic marketplace. The method also includes updating, with the one or more task-specific modules, a general module configured to implement the task-specific capability of the application, to create a customized application. The method additionally includes performing, using the customized application, a task-specific operation based on an input provided by the user. The method further includes causing a result of the task-specific operation to be presented to the user.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Figure 1:
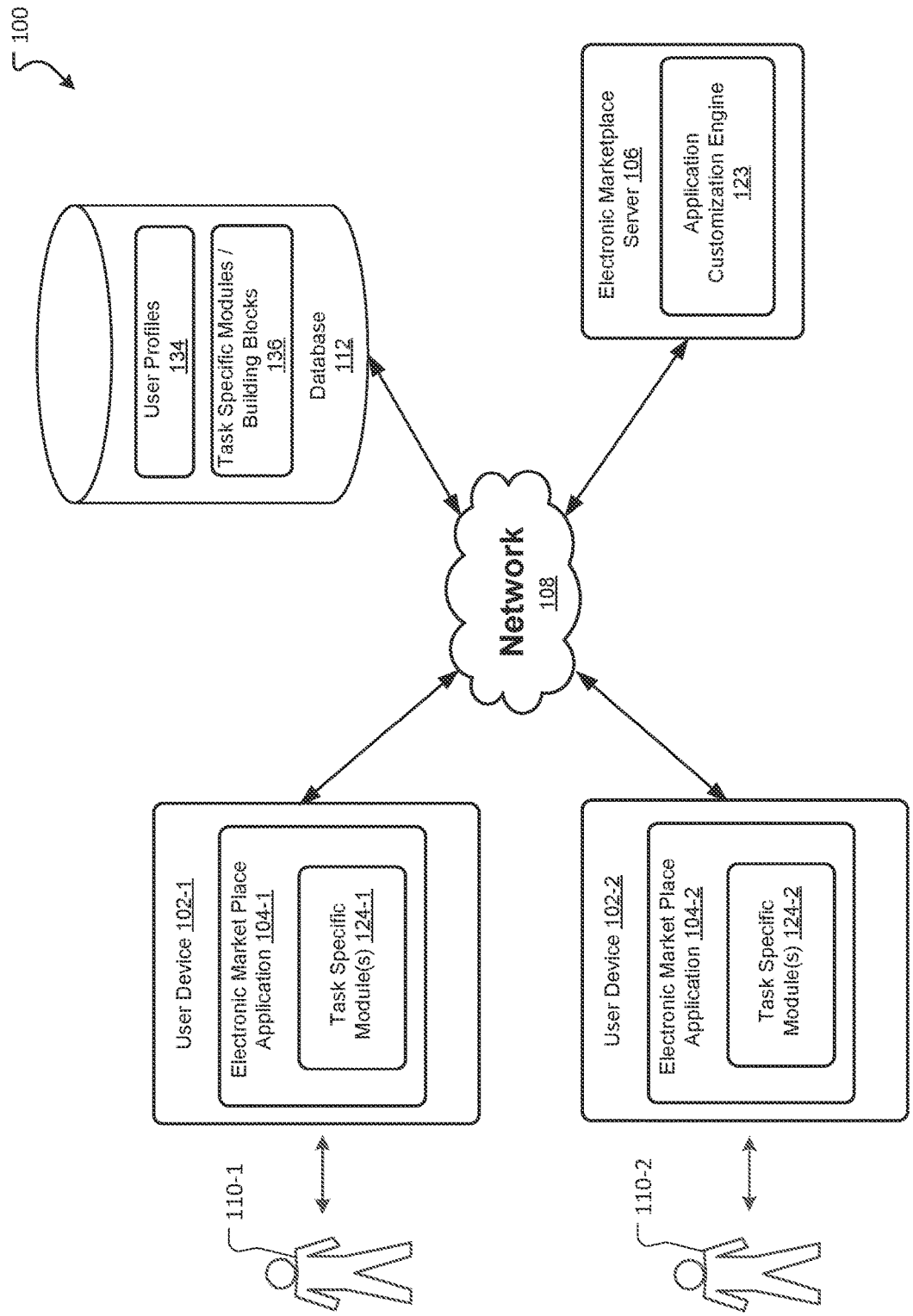
FIG. 1 illustrates an exemplary system for customizing capabilities of applications that allow users to engage with an electronic marketplace, in accordance with aspects of the present disclosure.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Aspects of the present disclosure relate to systems and methods for customizing applications to tailor capabilities of the applications to areas of interest of users of the applications. For example, one or more task-specific modules configured to perform tasks specific to areas of interest to a user of an application may be identified based on user data indicative of user self-declared interests and/or historical user data indicative of previous actions of the user. The one or more task-specific modules may be provided to the application, and may be used to update a general module of the application to enhance capability of the general module of the application. The general capability of the application may thus be tailored or customized to areas of interest to the user, without updating the application with other enhanced capabilities that may not be of interest to the user. As just an example, an electronic marketplace application may be customized in such manner with an enhanced capability of recognizing certain objects that may be of interest to a user of the electronic marketplace application, such as certain items that the user may wish to sell or buy using the electronic marketplace application, without updating the electronic marketplace application with enhanced capabilities to recognize other items or objects that may not be of interest to the user. In these ways, applications associated with different users may be dynamically and incrementally enhanced based on user interests or needs without performing overall updates of the users' applications and without causing unnecessary increases in size, memory storage requirements, web browser space requirements, etc. of the users' electronic marketplace applications.

It should be appreciated that although, for exemplary purposes, described aspects generally relate to electronic marketplace applications and, more particularly, applications that allow users to sell and/or buy items in an electronic marketplace, the present methods and systems are not so limited. For example, application enhancement techniques described herein may be used to provide dynamic and/or incremental updates tailored to user interests and needs in suitable applications other than electronic marketplace applications, such as any applications that may include various customizable features, to provide tailored user experiences in such applications without unnecessarily increasing size, memory storage requirements, web browser space requirements, etc. of the applications.

FIG. 1 illustrates an exemplary system 100 for dynamically customizing capabilities of applications, in accordance with aspects of the present disclosure. The system 100 may include one or more user devices 102 that may be configured to run or otherwise execute client applications 104. The one or more user devices 102 may include, but are not limited to, laptops, tablets, smartphones, and the like. The applications 104 may include applications that allow users to engage with an electronic marketplace (sometimes referred to herein as "electronic marketplace applications"), for example to allow users to sell items and/or to buy items in the electronic marketplace. In some examples, the applications 104 may include web applications, where such applications 104 may run or otherwise execute instructions within web browsers. In some examples, the applications 104 may additionally or alternatively include native client applications residing on the user devices 102. The one or more user devices 102 may be communicatively coupled to an electronic marketplace application server 106 via a network 108. The network 108 may be a wide area network (WAN) such as the Internet, a local area network (LAN), or any other suitable type of network. The network 108 may be single network or may be made up of multiple different networks, in some examples.

In aspects, the applications 104 may include various capabilities or features that allow users 110 to quickly and efficiently perform various tasks in an electronic marketplace. For example, the applications 104 may include a one-click listing feature that allows users 110 to create listings for sale of items, in the electronic marketplace, by providing images or video streams that depict the items. The application 104 may be operable to identify an item in an image or a video stream provided by the user 110, or may be operable to provide the image or video stream, in some form, to the application marketplace server 106 where object recognition may be applied to identify the item in the image or video stream. The identification of the item in the image or video stream may be used to assist the user 110 in creating a listing for the item. For example, the item identified in the image or video stream may be matched with a catalogue entry maintained by the electronic marketplace application server 106, and a listing may be automatically created for the user based on the catalogue entry. Of course, in various aspects, the applications 104 include other capabilities or features that assist users in engaging with the electronic marketplace in addition to, or instead of, object identification for automatic listing of items for sale in the electronic marketplace.

The electronic marketplace server 106 may include an application customization engine 123. As will be explained in more detail below, the application customization engine 123 may be configured to determine (e.g., select, generate and/or modify) particular task-specific modules 124 of interest to users 110 based on user data associated with the users 110. The user data associated with a user 110 may indicate specific areas of interest of the user 110 and/or may allow the application customization engine 123 to infer or otherwise determine the areas of interest of the user 110. The application customization engine 124 may be configured to additionally or alternatively identify particular task-specific modules 124 of interest to users 110 based on information identifying task-specific modules that may be targeted to the users 110 and/or may be provided as promotions to the users 110. The task-specific modules 124 determined by the application customization engine 123 may be used to dynamically and/or incrementally provide enhanced capabilities of the application 104 associated with the user 100, to tailor the capabilities of the application 104 to current interests or needs of the user 110.

In some aspects, the one or more task-specific modules 124 may include, for example, machine-learning or artificial intelligence models designed and/or trained to perform specific tasks that may be useful for the user 110. As an example, if the application customization engine 123 determines, for example based on user data associated with the user 110, that the user 110 may be interested in selling sneakers, the application customization engine 123 may provide, to the application 104 associated with the user 110, an object recognition module 124 trained to recognize sneakers in images and/or video streams, to extend or refine object recognition capabilities of the application 104 to provide better recognition for sneakers. Such extended object recognition capabilities of the application 104 associated with the user 110 may be useful to the user 110 when the user 110 attempts to create a listing for sale of sneakers in the electronic marketplace, for example. On the other hand, if the application customization engine 123 determines, for example based on user data associated with the user 110, that the user 110 may be interested in selling electronics or, even more specifically, electronic computer or audio equipment, the application customization engine 123 may provide, to the application 104 associated with the user 110, one or more object recognition modules 124 trained to recognize electronics or, more particularly electronic computer or audio equipment, in images and/or video streams, to extend or refine object recognition capabilities of the application 104 to provide better recognition for the electronics items of interest to the user 110.

In some aspects, the one or more task-specific modules 124 that may be dynamically and/or incrementally provided to an application 104 may include machine-learning and/or artificial modules designed and/or trained to perform tasks other than object recognition and/or may include modules other that the machine-learning or artificial intelligence modules. For example, the one or more task-specific modules 124 may include algorithms, functions or other suitable software modules that may be configured to perform various specific tasks that may be of interest to the user 110. Although, for exemplary purposes, the task-specific modules 124 are generally described herein as being modules that may dynamically and/or incrementally enhance object recognition capabilities of applications 104, in other examples the dynamic and/or incremental update techniques described herein are used to enhance other suitable capabilities or features provided by the applications 104, such as audio (e.g., voice) recognition features, user interface features, features related to adaptive assistance for filling of various forms, etc.

While the application customization engine 123 is illustrated in FIG. 1 as being executed by a marketplace application server 106, the application customization engine 123 may be at least partially executed at an application 104 running on a user device 102. For example, the application customization engine 123 may be operative at the user device 102 to determine one or more task-specific modules 124 for extending capabilities of the application 104 running or otherwise executing on the user device 102. Similarly, while the one or more task-specific modules 124 are illustrated in FIG. 1 as being installed on the applications 104, the one or more task-specific modules 124 determined for a user 110 may additionally or alternatively be associated in other manners with applications 104 of the users 110. For example, indications of the one or more task-specific modules 124 determined for a user 110 may be stored in a user profile 134 of the user 110, and the one or more task-specific modules 124 may be applied at the marketplace application 106 to data received from the user 110. In some aspects, if an application 104 is a web browser application, one or more task-specific modules 124 determined for the user 110 may be temporarily provided to, or otherwise evoked by, the browser when the user 110 accesses the application 104 via the browser.

With continued reference to FIG. 1, the system 100 may include a database 112. The database 112 may be communicatively coupled to the electronic marketplace server 106 and/or to the one or more user devices 102 via the network 108, as illustrated in FIG. 1, or may be coupled to the electronic marketplace server 106 and/or to the one or more user devices 102 in other suitable manners. For example, the database 112 may be directly connected to the electronic marketplace server 106, or may be included as part of the electronic marketplace server 106, in some examples. In various aspects, the database 112 may be a single database or may include multiple different databases.

The database 112 may store user profiles 134. Respective user profiles 134 may be associated with respective users 110, and may store user data that may be utilized for customizing applications 104 of the users 110. A user profile 134 for a user 110 may be generated and/or maintained at least partially by the application customization engine 123, or may be generated and/or maintained at least partially by another engine that may be running on the electronic marketplace server 106. In aspects, a user profile associated with a user 110 may include one or both of i) indications of areas of interest in the electronic marketplace that may be declared by the user 110 (sometimes referred herein as "declarative user data") and ii) historical data indicative of previous engagements of the users 110 with the electronic marketplace, such as selling, buying or browsing history of the user 110 in the electronic marketplace (sometimes referred herein as "historical user data"). In some aspects, the user profile 134 may additionally or alternatively include other information associated with and/or characteristic of the user 110, such as one or more of i) whether the user 110 is a seller in the electronic marketplace, ii) a segment in the electronic marketplace in which the user 110 operates, iii) whether the user 110 is a business to consumer (B to C) seller, a business to business (B to B) seller or a consumer to consumer (C to C) seller, iv) item categories that may be of interest to the user 110, v) whether the user 110 a vocational seller and/or a niche space seller, vi) items previously sold by the user 110, vii) items previously bought by the user 110, viii) frequency of sales and/or purchases of particular items by the user 110, and the like. The user profile 134 may be periodically updated by the electronic marketplace server 106 and/or the application 104 as more information about the user 110 becomes known to the electronic marketplace server 106 and/or the application 104. For example, sales, buying and/or browsing history in the user profile 134 may be updated as the user 110 performs operations related to selling, buying and/or browsing in the electronic marketplace via the application 104, or via other means of engagement with the electronic marketplace.

In aspects, the application customization engine 123 is configured to access a user profile 134 based on a user identifier (user ID) associated with the user 110, and, based on user data that may be included in the user profile 134, may select or generate one or more task-specific modules 124 for customizing the application 104 of the user 110. The application customization engine 123 may determine one or more task-specific modules 124 for customizing the application 104 based on the areas of interest that may be determined or inferred from the user data in the user profile 134. As an example, the application customization engine 123 may determine that the user may be interested in selling shoes and/or watches based on previous sales, buying, or browsing history of the user, for example if the user data indicates that the user 110 has recently sold, bought, or browsed for shoes and/or watches in the electronic marketplace. In response to determining that the user 110 may be interested in selling shoes and/or watches, the application customization engine 134 may cause one or more tasks-specific modules 124 for recognizing shoes and/or watches in images or video streams to be provided to enhance the general image or video stream object recognition capability of the application 104 associated with the user 110.

In an example, the application customization engine 123 is configured to select, based on the user data that may be included in the user profile 134 associated with the user 110, one or more of the task-specific modules 124 from a plurality of available task-specific modules in a task-specific module store 136 in the database 112. The application customization engine 123 may be configured to additionally, or alternatively, generate, based on the user data that may be included in the user profile 134 associated with the user 110, one or more custom task-specific modules 124. For example, the application customization engine 123 may be configured to build custom task-specific modules 124 from multiple modules or sub-modules that may be available in the task-specific store 136. Example selection and/or customization of task-specific modules that may be performed based on user data by the application customization engine 123, according to some aspects, are described in more detail below with reference to FIG. 2.

In some aspects, when a user 110 is a new user of the electronic marketplace, the user 110 may attempt to download an application 104 to the user device 102 of the user 110. The electronic marketplace server 106 may receive a request for downloading an application 104, and may provide a suitable version of the application 104 to the user device 102 of the user 110, for download and install on the user device 102 of the user 110. In an example, because the user 110 is a new user, the electronic marketplace server 106 may not be able to obtain user data for customizing the application 104. For example, the user may not yet have a user ID for use in the marketplace, and a user profile 134 associated with the user 110 may not yet exist in the database 112. In some such aspects, the electronic marketplace server 106 may provide, to the user device 102 of the user 110, a base or a default version of the application 104 that may provide various capabilities commonly used by users of the applications 104. On the other hand, if at least some user data associated with a user 110 can be obtained by the electronic marketplace server 106, then the application customization engine 12 may determine one or more initial task-specific modules 124 that may be of interest to the user 110, and an initial extended version of the application 104 may be provided to the user device 102 of the user 110. Subsequently, when at least some user data (or at least some additional user data) is collected or otherwise obtained for the user 110, the electronic marketplace server 106 may determine one or more task-specific modules 124 that may be of interest to the user 110, and may dynamically and/or incrementally provide the one or more task-specific modules 124 to the user device 102 to enhance and/or refine capabilities of the application 104 to tailor the capabilities of application 104 based on specific interests and needs of the user 110.

With continued reference to FIG. 1, upon determining (e.g., selecting, generating and/or modifying) one or more task-specific modules 124 for customizing an application 104 of a user 110, the application customization engine 123 may provide the one or more task-specific modules 124 to the user device 102 of the user 110 for updating the application 104 that may be running on the user device 102 of the user 110. In aspects, the application 104 may be configured to prompt the user 110 to initiate download and installation of the one or more task-specific modules 124 via a user interface of the application 104. In some aspects, the application 104 may prompt the user 110 to initiate download and installation of a particular task-specific module 124 while the user 110 is using the application 104, for example at a time when the particular task-specific module may become relevant and useful to the user 110. As an example, if a particular task-specific module 124 is a module for recognizing sneakers, then the application 104 may prompt the user 110 to initiate download and installation of the particular task-specific module 124 at a time when the user 110 is attempting to generate a listing for the sneaker via the application 104 or when the user 110 is browsing for the sneaker via the application 104. In some aspects, the electronic marketplace server 106 or the application 104 may automatically, without user input, initiate download and installation of at least some of the one or more task-specific modules 124 at the application 104, for example when the user 110 opens the application 104 on the user device 102, or at times when the task-specific modules become relevant and useful for the user 110. In some such aspects, the electronic marketplace server 106 or the application 104 may automatically, without user input, initiate download and installation if the user 110 has opted in for automatic updates of the application 104.

In aspects, one or more task-specific modules 110 that the application customization engine 123 may determine for customizing a first application 104-1 of a first user 110-1 based on user data associated with the first user 110-1 may be different from one or more task-specific modules 104-2 that the application customization engine 123 may determine for customizing a second application 104-2 of a second user 110-2 based on user data associated with the first user 110. Thus, the first application 104-1 of the first user 110-1 may be customized with different extended capabilities as compared to the extended capabilities of the second application 104-2. As just an example, the first application 104-1 may be customized to extend object recognition capabilities of the first application 104-1 to better recognize sneakers in images provided by the user 110-1 (e.g., if the application customization engine 123 that sneakers is an area of interest for the user 110-1) whereas the second application 104-2 may be customized to extend object recognition capabilities of the second application 104-2 to better recognize watches in images provided by the user 110-2 (e.g., if the application customization engine 123 determines that watches is an area of interest for the user 110-2). Because the first application 104-1 is customized with capabilities tailored to the user 110-1, as determined based on user data associated with the user 110-1, the first application 104-1 may be updated with only the specific capabilities of interest to the user 110-1 and without unnecessarily increasing the size, storage space requirements, etc., of the first application 104-1. Similarly, because the second application 104-2 is customized with capabilities tailored to the user 110-2, as determined based on user data associated with the user 110-2, the first application 104-2 may be updated with only the specific capabilities of interest to the user 110-2 and without unnecessarily increasing the size, storage space requirements, etc., of the second application 104-2.

In some aspects, an application 104 (e.g., the application 104-1) of a user 110 (e.g., the user 110-1) may be incrementally updated based on additional user data and/or additional inferences from user data that may become available for the user 110-1. As an example, after providing, to the user device 102-1 of the user 110-1, a task-specific module 124-1 to extend object recognition capabilities of the application 104-1 to better recognize sneakers in images provided by the user 110-1, the application customization engine 123 may determine that the user 110-1 is now interested in selling electronics. In one example, the application customization engine 123 may determine that the user 110-1 is now interested in selling electronics based on additional declarative user data and/or additional historical user data that may become available in a user profile 134 associated with the user 110-1. In another example, the application customization engine 123 may infer that the user 110-1 is now interested in re-selling a particular electronics item (e.g., a cellphone) based on user data that indicates that the user 110-1 bought the item a certain period of time in the past (e.g., a year ago). In aspects, upon determining that the user 110-1 may now be interested, for example, in selling electronics or re-selling a particular electronics item, the application customization engine 123 may provide, to the user device 102-1, one or more additional task-specific modules 124 to further extend or refine object recognition capabilities of the application 104-1 to better recognize electronics or particular electronic items in images or video streams provided by the user 110-1. Of course, the application customization engine 123 may determine one or more task-specific modules 124 in areas other than object recognition that may be useful to the user 110-1, such as areas of voice recognition, user interface customization, etc., and may provide the one or more task-specific modules 124 in areas other than object recognition to the user device 102-1 for dynamically or incrementally updating different areas of the application 104-1, in some examples.

Referring still to FIG. 1, in some aspects, the application customization engine 123 and/or an application 104 (e.g., the application 104-1) may be configured to determine that one or more task-specific modules 124-1 installed in the application 104-1 may no longer be needed by the user 110-1. For example, the application customization engine 123 and/or an application 104-1 may determine that a particular task-specific module 124-1 is no longer needed if the user 110-1 has not used the extended capability provided by the particular task-specific module 124-1 in a certain (e.g., predetermined) period of time, such as in a certain number of days or months, for example. In another example, the user 110-1 may provide an explicit indication, for example via a user interface of the application 104-1, that the user 110-1 is no longer interested in the area or task provided by the particular task-specific module 124-1. Upon determining that one or more particular task-specific module 124-1 are no longer needed by the user 110-1, in an example, the application customization engine 123 and/or the application 104-1 may automatically initiate removal of the one or more particular task-specific modules 124-1 from the application 104-1 on the user device 102-1, for example if the user 110-1 has opted into automatic removal of unnecessary capabilities from the application 104-1. In another example, the application 104-2 may prompt the user 110-1 to initiate removal of the one or more particular task-specific modules 124-1 from the application 104-1 on the user device 102-1. By removing unnecessary task-specific modules 124-1 from the application 104-2, the size, storage requirements, etc., of the application 104-1 may be further dynamically controlled based on needs of the user 110-1.

Figure 2:
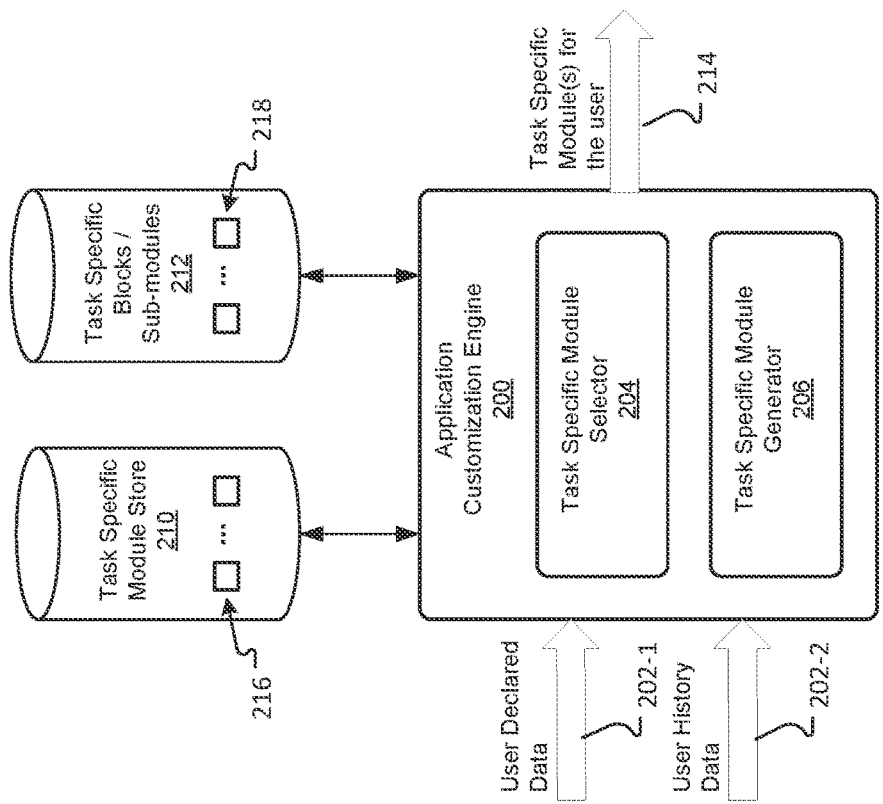
FIG. 2 depicts an example of an application customization engine, in accordance with aspects of the present disclosure.

FIG. 2 depicts an example of an application customization engine 200, in accordance with aspects of the present disclosure. In an example, the application customization engine 200 corresponds to the application customization engine 123 of FIG. 1. For ease of explanation, the application customization engine 200 is described with reference to FIG. 1. In another example, the application customization engine 200 may be utilized in a system different from the system 100 of FIG. 1.

The application customization engine 200 is configured to receive user data 202 associated with users 110 of applications 104 and, based on the user data 202, select, generate and/or modify task-specific modules to be provided to the applications 104 to enhance capabilities of the applications 104. The application customization engine 200 may obtain user data 202 associated with a user 110 for example by accessing a user profile 134 based on a user ID associated with the user 110. The user data 202 may include one or both of i) interest information 202-1 provided by the user 110 and ii) historical data indicative of previous engagement of the user 110 with the electronic marketplace. The user data 202 may additionally or alternatively include other information about the user 110. Generally, the user data 202 may include any suitable information characterizing the user 110, such as whether the user 110 is a seller in the electronic marketplace, a segment in the electronic marketplace in which the user 110 operates, whether the user 110 is a business to consumer (B to C) seller, a business to business (B to B) seller or a consumer to consumer (C to C) seller, categories of interest to the user 110, whether the user 110 a vocational seller, whether the user 110 is a niche space seller, items previously sold by the user 110, items previously bought by the user 110, frequency of sales and/or purchases of particular items by the user 110, and the like.

The user data 202 may be provided to a task-specific module selector 204 and/or a task-specific module generator 206. The task-specific module selector 204 may be configured to select, based on the user data 202, one or more task-specific modules, from among a plurality of available task-specific modules 214, that may be stored in the task-specific module store 136. The available task-specific modules 214 in the task-specific module store 136 may include machine learning modules trained for specific tasks, such as processing and recognition tasks for identifying specific items in data streams (e.g., images, videos, etc.). The available task-specific modules 214 may additionally or alternatively include other types of modules, such as machine learning or artificial intelligence modules designed and/or trained to perform other types of recognition tasks, such as specific audio recognition tasks (e.g., to detect and/or recognize specific words or phrases in a voice or other audio stream) and/or may include modules other than machine learning or artificial intelligence modules, such as algorithms or other suitable software modules for performing specific tasks.

The application customization engine 200 is illustrated in FIG. 2 as being communicatively coupled to a task-specific module store 210 and a task-specific blocks/sub-modules store 212. The task-specific module store 210 and the task-specific blocks/sub-modules store 212 may reside in the database 112, for example. The task-specific module selector 204 may select the one or more task-specific modules 214, from among a plurality of available task-specific modules 216 that may be stored in the task-specific module store 210. For example, the task-specific module selector 204 may select the one or more task-specific modules 214 by matching user data 202 with tags that may be associated in the task-specific module store with the available task-specific modules 216 in the task-specific module store 210. In an example, the available task-specific modules 216 may be tagged with identifications of specific items (e.g., sneakers, watches, trading cards, etc.), specific categories, specific areas of interest, etc. The task-specific module selector 204 may select the one or more task-specific modules 214, from among the plurality of task-specific modules 216, by matching tagged task-specific modules 216 with items, categories, areas of interest, etc., indicated by, inferred from, or otherwise determined based on the user data 202. Additionally or alternatively, the task-specific module selector 204 may be configured to learn connections between available task-specific modules 214 and items, categories, areas of interest, etc., and may select the one or more task-specific module store 210 based on items, categories, areas of interest, etc., indicated by, inferred from, or otherwise determined based on the user data 202 and the inferred connections. The task-specific module selector 204 may be configured to learn such connections based on trend data, for example. For example, the task-specific module selector 204 may learn that users 110 who have bought or sold particular items (e.g., watches) are typically also interested in buying or selling other items (e.g., watch bands). In other aspects, the task-specific module selector 204 may be configured learn or infer connections between user data and particular available task-specific modules 214 in suitable manners other than based on trend data. In some aspects, the task-specific module selector 204 may select particular task-specific modules 214 based at least in part on information identifying task-specific modules that may be targeted to a particular user and/or may be provided as a promotion to the particular user.

The task-specific module generator 206 may be configured to generate task-specific modules based on the user data 202 and/or modify, based on the user data 202, task-specific modules selected by the task-specific module selector 204 to generate task-specific modules more tailored to the user 110. In aspects, the task-specific module generator 206 is configured to build custom task-specific modules for the user 110 from building blocks or sub-modules 218 that may be stored in the task-specific blocs/sub-modules store 212. As an example, the task-specific module generator 206 may be configured to use specific building blocks or sub-modules 218 to build a custom user interface for the user 110 to tailor the user interface of the application 104 associated with the user 110 to needs or interests of the user 110 indicated in, inferred from, or otherwise determined based on the user data 202. In other examples, the task-specific module generator 206 may be configured to use specific building blocks or sub-modules 218 to build other suitable task-specific modules to be provided for customization of the application 104 associated with the user 110.

In some aspects, the application customization engine 200 omits the task-specific module selector 204 or the task-specific module generator 206. For example, the application customization engine 200 includes either the task-specific module selector 204 configured to select one or more task-specific modules 212 based on user data 202 or the task-specific module generator 206 configured generate one or more task-specific modules 214 based on user data 202, for example by building the one or more task-specific modules 214 using task-specific building blocks or sub-modules 216.

Figure 3:
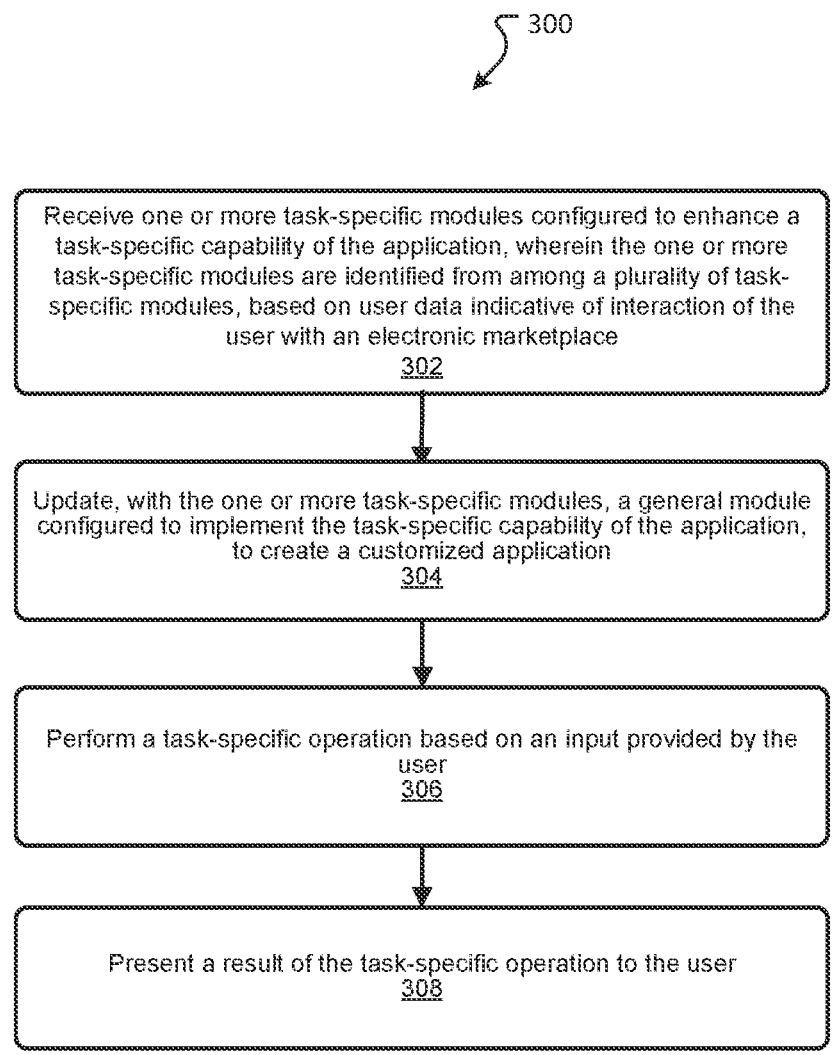
FIG. 3 illustrates an exemplary method for customizing an electronic marketplace application at a client device, in accordance with aspects of the present disclosure.

FIG. 3 illustrates an exemplary method 300 for customizing an electronic marketplace application at a client device, in accordance with aspects of the present disclosure. In one example, the method 300 may be performed by a client device to customize a marketplace application that may be installed and/or running on the client device. A general order of the operations for the method 300 is shown in FIG. 3. The method 300 may include more or fewer steps or may arrange the order of the steps differently than those shown in FIG. 3. The method 300 can be executed as a set of computer-executable instructions executed by a computer system and encoded or stored on a computer readable medium. Further, the method 300 can be performed by gates or circuits associated with a processor, an ASIC, an FPGA, a SOC or other hardware device. Hereinafter, the method 300 shall be explained with reference to the systems, components, devices, modules, software, data structures, data characteristic representations, signaling diagrams, methods, etc., described in conjunction with FIGS. 1, 2, 4, and 5.

Method 300 begins at operation 302 at which one or more task-specific modules configured to enhance a task-specific capability of the electronic marketplace application are received at the electronic marketplace application. The one or more task-specific modules may be selected from among a plurality of task-specific modules based on user data indicative of interaction of the user with an electronic marketplace. In some aspects, at least one of the one or more task-specific modules may be generated based on the user data, or may be modified based on the user data to further tailor the at least one task-specific module to interests or needs of the user. The one or more task-specific modules are transmitted, over a network, from a server that selected and/or generated the one or more task-specific module to a user device running the electronic marketplace application, for example. In other aspects, the one or more task-specific modules configured to enhance a task-specific capability of the electronic marketplace application are obtained by the electronic marketplace application in other suitable manners.

At block 304, a general module configured to implement the task-specific capability of the application is updated with the one or more task-specific modules to create a customized application. For example, a general object recognition module that may be already provided in the electronic marketplace application may be updated with a task-specific module for recognizing a particular item, such as a sneaker or a watch, that was determined to be relevant and useful to the user. In aspects, the update of the general module is initiated automatically by the server or by the electronic marketplace application. In other aspects, block 304 includes prompting the user to initiate update of the general module by the electronic marketplace application. In some aspects, the user is prompted in initiate update of the general module at a time when it is determined that the update may become relevant and useful to the user as the user is engaging with the electronic marketplace via the electronic marketplace application.

At block 306, a task-specific operation is performed using the customized application. In aspects, the task-specific operation is performed based on an input provided by the user. For example, an object recognition task is performed using an enhanced capability object recognition item. At block 308, a result of the task-specific operation is provided for presentation to the user. For example, a listing generated based on an item recognized in an image provided by the user is provided to the user via the user interface of the customized electronic marketplace application, allowing the user to quickly list the item for sale in the electronic marketplace.

Figure 4:
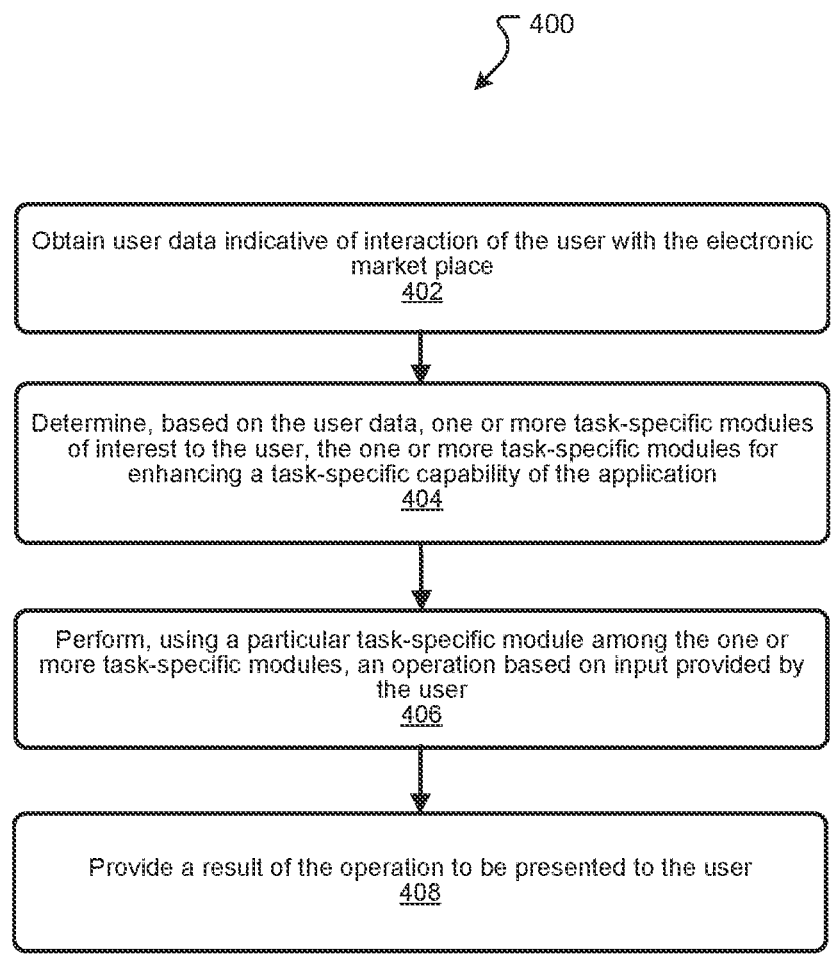
FIG. 4 illustrates an exemplary method for determining one or more task-specific modules for performing a particular task of interest to a user of an electronic marketplace application, in accordance with aspects of the present disclosure.

FIG. 4 illustrates an exemplary method 400 for determining one or more task-specific modules for performing a particular task-specific task of interest to a user of a marketplace application, in accordance with aspects of the present disclosure. In one example, the method 400 may be performed by a marketplace server. In another example, the method 400 is performed at least partially by a client device.

A general order of the operations for the method 400 is shown in FIG. 4. The method 400 may include more or fewer steps or may arrange the order of the steps differently than those shown in FIG. 4. The method 400 can be executed as a set of computer-executable instructions executed by a computer system and encoded or stored on a computer readable medium. Further, the method 400 can be performed by gates or circuits associated with a processor, an ASIC, an FPGA, a SOC or other hardware device. Hereinafter, the method 300 shall be explained with reference to the systems, components, devices, modules, software, data structures, data characteristic representations, signaling diagrams, methods, etc., described in conjunction with FIGS. 1, 2, 3, and 5.

Flow begins at operation 402 where a user data indicative of interaction of the user with an electronic marketplace is obtained. The user data may be obtained from a user profile associated with the user. The user profile may be built for the user based on analyzing various previous interactions of the user with the electronic marketplace. The user profile may additionally or alternatively include information specifically expressed by the user, for example when the user is prompted to expressly indicate areas or items of interest to the user via a user interface of the electronic marketplace application. The user data may thus include, for example, one or both of one or both of i) interest information provided by the user and ii) historical data indicative of previous activity of the user.

At block 404, one or more task-specific modules of interest to the user are determined based on the user data obtained at block 402. In some aspects, one or more task-specific modules may additionally or alternatively be determined based on In some aspects, the task-specific module selector 204 may additionally or alternatively information identifying task-specific modules that may be targeted to the user and/or may be provided as a promotion to the user. In aspects, the one or more task-specific modules are for enhancing a task-specific capability of the application. As just an example, the one or more task-specific modules include trained object recognition models or specific object recognition algorithms for identifying, in images or video streams provided by the user, specific items that may be of interest to the user. In other aspects, the one or more task-specific modules additionally or alternatively include other suitable modules for enhancing a task-specific capability of the application.

At block 406, a task-specific operation is performed using the customized application. In aspects, the task-specific operation is performed based on an input provided by the user. For example, an object recognition task is performed using an enhanced capability object recognition item. At block 408, a result of the task-specific operation is provided for presentation to the user. For example, a listing generated based on an item recognized in an image provided by the user is provided to the user via the user interface of the customized electronic marketplace application, allowing the user to quickly list the item for sale in the electronic marketplace.

Figure 5:
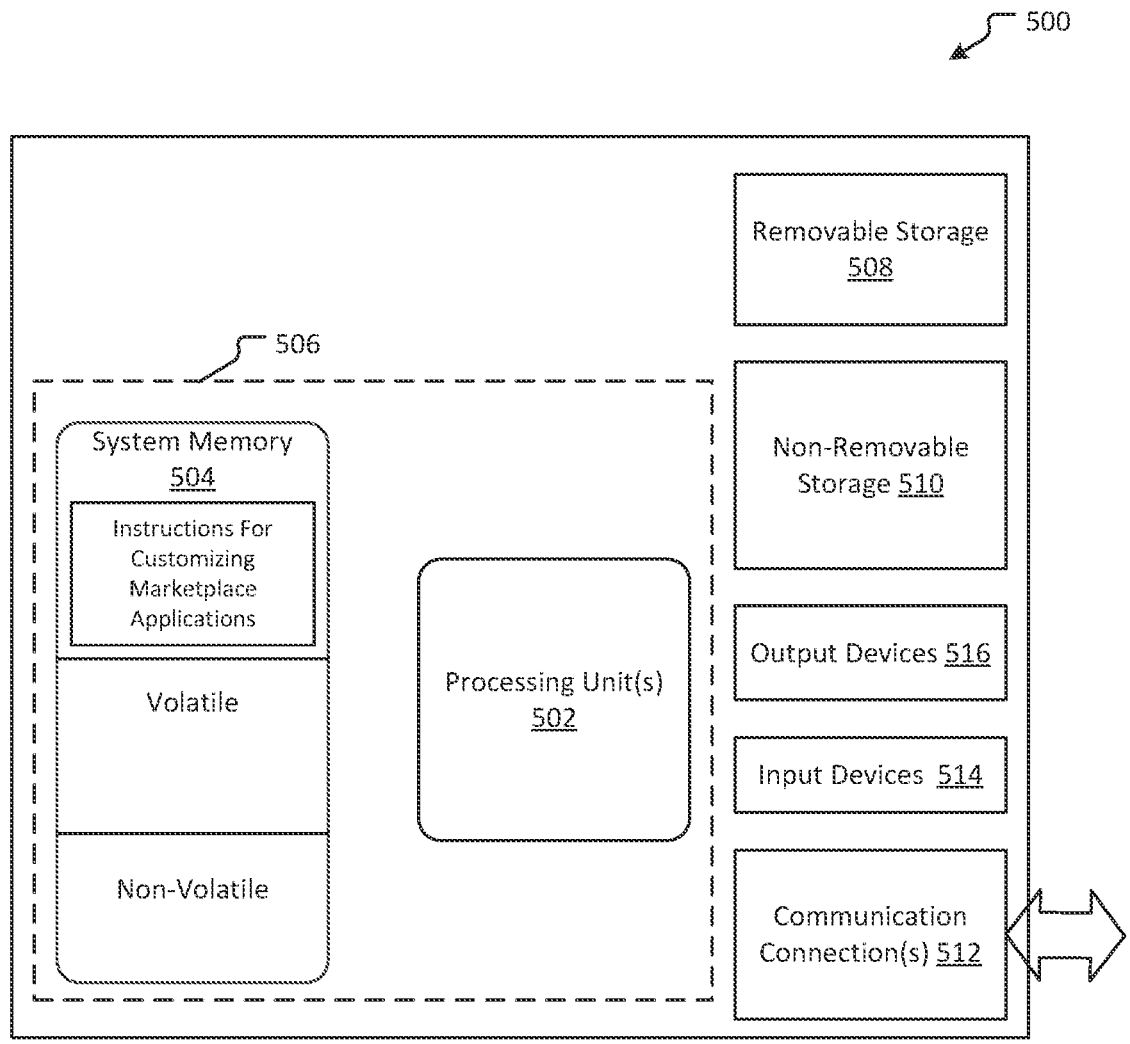
FIG. 5 is a block diagram illustrating example physical components of a computing device with which aspects of the disclosure may be practiced.

FIG. 5 illustrates a simplified block diagram of the device with which aspects of the present disclosure may be practiced in accordance with aspects of the present disclosure. One or more of the present aspects may be implemented in an operating environment 500. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 500 typically includes at least one processing unit 502 and memory 504. Depending on the exact configuration and type of computing device, memory 504 (instructions to perform customization of applications as described herein) may be volatile (such as RAM), non-volatile (such as ROM, flash memory, etc.), or some combination of the two. This most basic configuration is illustrated in FIG. 5 by dashed line 506. Further, the operating environment 500 may also include storage devices (removable, 508, and/or non-removable, 510) including, but not limited to, magnetic or optical disks or tape. Similarly, the operating environment 500 may also have input device(s) 514 such as keyboard, mouse, pen, voice input, on-board sensors, etc. and/or output device(s) 516 such as a display, speakers, printer, motors, etc. Also included in the environment may be one or more communication connections, 512, such as LAN, WAN, a near-field communications network, point to point, etc.

Operating environment 500 typically includes at least some form of computer readable media. Computer readable media can be any available media that can be accessed by at least one processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system for customizing an application, the system comprising:
    a processor; and
    memory including instructions which, when executed by the processor, causes the processor to:
    receive one or more task-specific modules configured to enhance a task-specific capability of the application, wherein the one or more task-specific modules are identified, from among a plurality of task-specific modules, based at least on user data indicative of interaction of the user with a type of item on an electronic marketplace;
    update, with the one or more task-specific modules, a general module configured to implement the task-specific capability of the application, to create a customized application, the task-specific module comprising an object recognition module trained to recognize the type of item in images;
    perform, using the customized application, a task-specific operation based on an input provided by the user; and
    cause a result of the task-specific operation to be presented to the user.

2. The system of claim 1, wherein the user data indicative of interaction of the user with the electronic marketplace includes one or both of i) interest information provided by the user and ii) historical data indicative of previous activity of the user.

3. The system of claim 2, wherein:
    the customized application supports selling of products and buying of products, and
    the historical data indicative of previous activity of the user includes one or both of i) sales history of the user, the sales history indicating products previously sold by the user and ii) buying history of the user, the buying history indicating products previously bought by the user.

4. The system of claim 1, wherein the one or more task-specific modules are identified, from among the plurality of task-specific modules, further based on one or both of i) information identifying at least one task-specific module targeted to the user and ii) information identifying at least one task-specific module to be provided as a promotion to the user.

5. The system of claim 1, wherein the one or more task-specific modules includes a machine-learning model trained to perform the operation.

6. The system of claim 1, wherein the type of item corresponds to a specific category of interest to the user.

7. The system of claim 6, wherein the one or more task-specific modules include a machine-learning model trained to recognize the type of item in the specific category of interest to the user.

8. The system of claim 1, wherein the one or more task-specific modules are selected based on learned associations between user interactions and task-specific modules available for customizing the application.

9. The system of claim 1, wherein the instructions, when executed by the processor, further cause the processor to:
    after updating the general module, incrementally receive one or more additional task-specific modules configured to further enhance additional task-specific capabilities of the customized application, wherein the one or more additional task-specific modules are identified based on additional user data indicative of interaction of the user with the application;
    update, with the one or more additional task-specific modules, the customized application to create a further customized application;
    perform, using the further customized application, a further operation based on further input provided by the user; and
    cause a result of the further operation to be presented to the user.

10. The system of claim 1, wherein the instructions, when executed by the processor, further cause the processor to:
    after updating the general module, determine that a particular task-specific module, among the one or more task-specific modules, is to be removed from the application, and
    in response to determining that the particular task-specific module is to be removed from the application, remove the particular task-specific module from the general module of the application.

11. A method for customizing experience of a user of an electronic marketplace application, the method comprising:
    obtaining user data indicative of interaction of the user with an electronic marketplace;
    determining, based on the user data, one or more task-specific modules of interest to the user, the one or more task-specific modules for enhancing a task-specific capability of the application, wherein the one or more task-specific modules include an object recognition module configured to recognize a type of item in images;

performing, using a particular task-specific module among the one or more task-specific modules, an operation based on input provided by the user; and causing a result of the operation to be presented to the user.

12. The method of claim 11, wherein obtaining the user data comprises obtaining one or both of i) interest information provided by the user and ii) historical data indicative of previous activity of the user.

13. The method of claim 11, further comprising analyzing the user data to detect one or more areas of interest to the user, wherein identifying the one or more task-specific modules comprises identifying the one or more task-specific modules based on the detected one or more areas of interest to the user.

14. The method of claim 13, wherein analyzing the user data includes using machine learning to detect trends in the user data.

15. The method of claim 11, further comprising:
providing a base version of the application to the user, and
in response to identifying the one or more task-specific modules of interest to the user, causing the base version of the application provided to the user to be updated with the one or more task-specific modules of interest to the user.

16. The method of claim 11, further comprising, prior to performing the operation based on the input provided by the user, dynamically customizing the particular task-specific module based on the user data.

17. A computer storage medium encoding computer executable instructions that, when executed by at least one processor, perform a method comprising:
receiving one or more task-specific modules configured to enhance a task-specific capability of an application, wherein the one or more task-specific modules are identified from among a plurality of task-specific modules, based on user data indicative of interaction of the user with a type of item on an electronic marketplace;
updating, with the one or more task-specific modules, a general module configured to implement the task-specific capability of the application, to create a customized application, the task-specific module comprising an object recognition module trained to recognize the type of item in images;
performing, using the customized application, a task-specific operation based on an input provided by the user; and
causing a result of the task-specific operation to be presented to the user.

18. The computer storage medium of claim 17, wherein the user data indicative of interaction of the user with the electronic marketplace includes one or both of i) interest information provided by the user and ii) historical data indicative of previous activity of the user.

19. The computer storage medium of claim 18, wherein:
the customized application supports selling of products and buying of products, and
the historical data indicative of previous activity of the user includes one or both of i) sales history of the user, the sales history indicating products previously sold by the user and ii) buying history of the user, the buying history indicating products previously bought by the user.

20. The computer storage medium of claim 17 further encoding computer executable instructions that, when executed by at least one processor, perform the method further comprising
after updating the general module, incrementally receive one or more additional task-specific modules configured to further enhance additional task-specific capabilities of the customized application, wherein the one or more additional task-specific modules are identified based on additional user data indicative of interaction of the user with the application;
updating, with the one or more additional task-specific modules, the customized application to create a further customized application;
performing, using the further customized application, a further operation based on further input provided by the user; and
causing a result of the further operation to be presented to the user.

* * * * *